United States Patent Office 3,454,065
Patented July 8, 1969

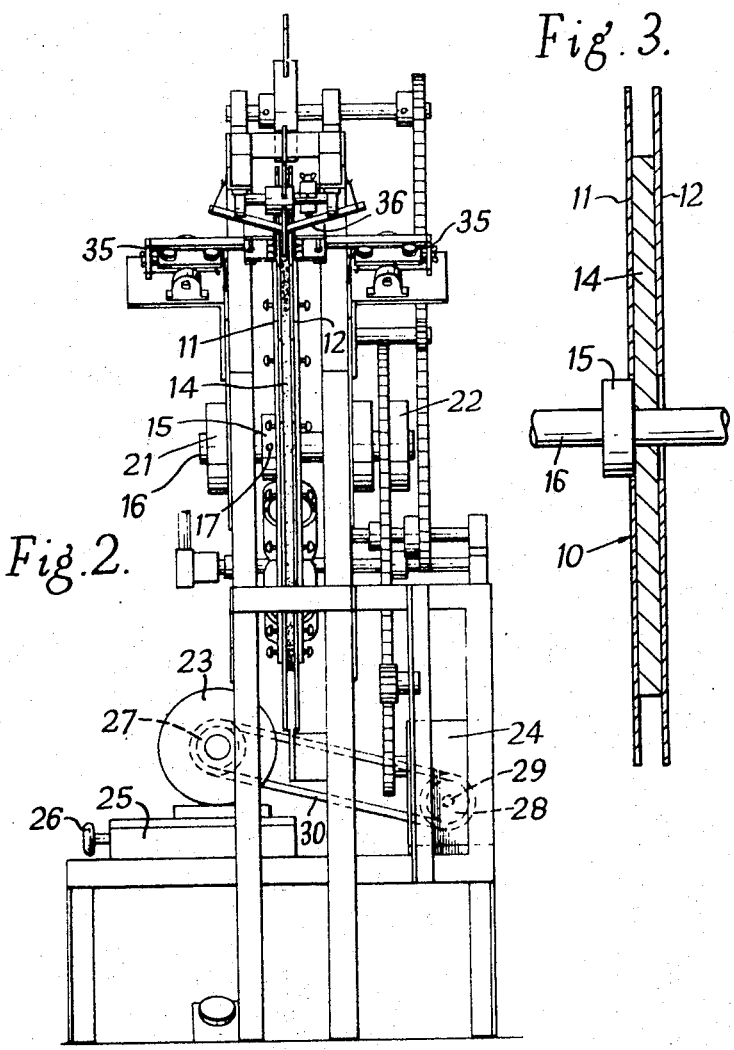
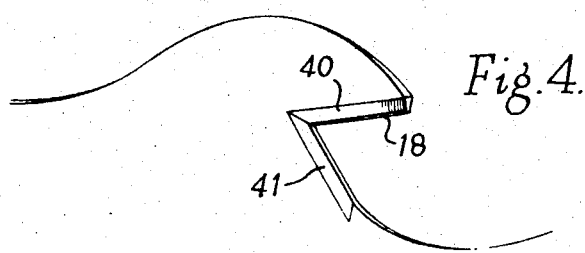

3,454,065
TREATMENT OF FRUIT AND VEGETABLE CROPS
Leslie Arthur Parsons, Burry Port, Wales, assignor to Leslie A. Parsons & Sons Limited
Filed Nov. 4, 1966, Ser. No. 592,034
Claims priority, application Great Britain, Nov. 26, 1965, 50,302/65, 50,304/65; July 4, 1966, 29,916/66
Int. Cl. A01d 23/04
U.S. Cl. 146—83                                    4 Claims

ABSTRACT OF THE DISCLOSURE

An onion topping and tailing machine has a pair of knives, and for carrying the onions past the knives, a pair of circular plates secured to each other in spaced relation and rotatable about a horizontal axis. The plates have pairs of axially aligned V-shaped notches in their peripheries. A star wheel has arms which enter between the plates to hold the onions in their respective pair of notches while the onion is cut by the topping and tailing knives.

---

This invention relates to article carriers, more especially carriers for supporting and conveying onions and other similar articles of root and fruit crops to a position where they are subjected to the action of knives or other treating means.

The object of the present invention is to provide article carriers which support successive articles of different sizes in such manner that they are cut or otherwise treated in a regular manner.

According to the invention there is provided an article carrier having movable means provided with a succession of pairs of approximately V-shaped notches located side by side but spaced apart from each other by a predetermined distance, the inside surfaces of each notch being on opposite sides of the line of motion passing through an article treating position, and means for moving the pairs of notches through a feed position to an article treating position.

Each onion or other article is placed in a pair of notches with the axis of the onion (through the top and tail) disposed transversely of the line of motion of the carriers and laterally through the notches and the shoulders of the onion resting on the inside edges of the notches with the central part of the onion disposed between the pair of notches.

While the carriers could be arranged to move in a straight line it is preferred that they should move in a circular path and for this purpose they may be located on the periphery of a wheel-like member.

The invention will now be described, by way of example, with reference to the accompanying drawings, wherein:

FIGURE 2 illustrates an end view elevation of the machine illustrated in FIGURE 1 as viewed along the line 2—2;

FIGURE 3 is a diagrammatic cross-section through a rotatable article carrier according to the invention; and FIGURE 4 is a perspective view of one V-shaped notch showing the chamfering on the inner corner edge thereof.

Figure 1:
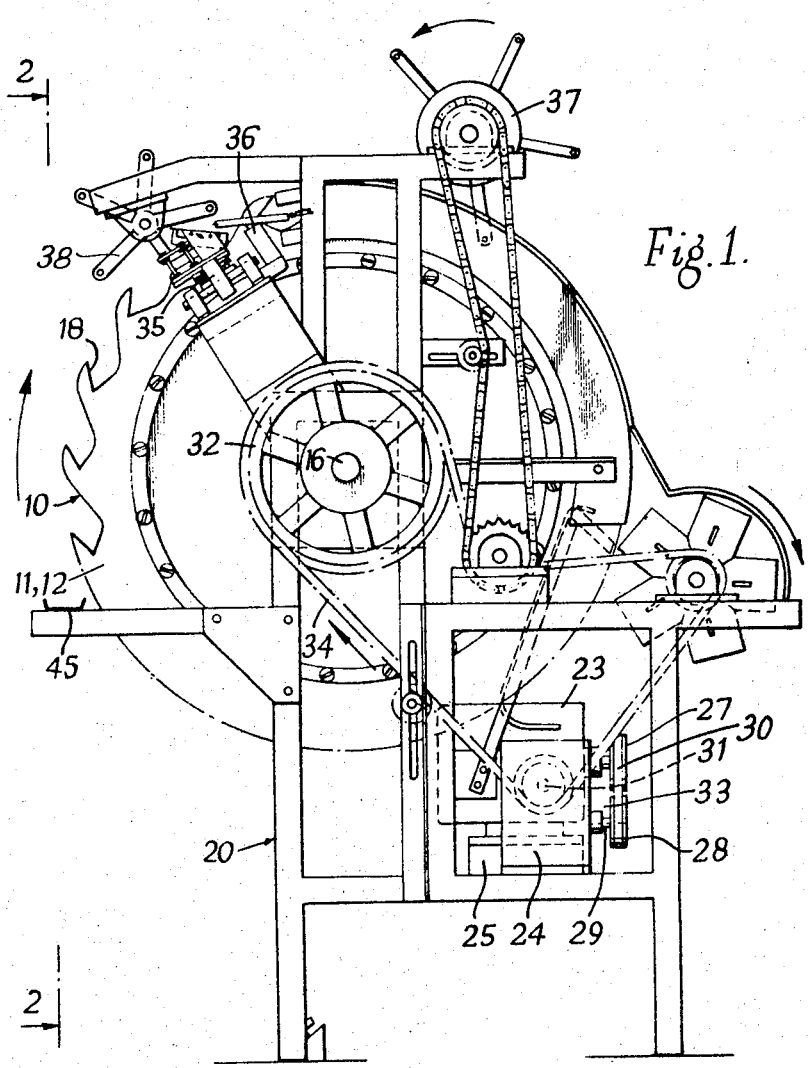
FIGURE 1 illustrates a side elevation of a machine for treating onions and which embodies an article carrier in accordance with the invention.

The onion carrier 10 comprises two approximately circular plates or discs 11, 12 which are fixed to a circular spacer member 14 so as to be parallel to each other and concentric with the spacer member. The spacer member 14, which may be between one-quarter to one-half inch thick, for example three-eighths of an inch, is secured to a bush 15, for example by welding or screws, so as to be concentric therewith. The spacer member 14 and the bush 15 have an axially extending hole provided in the centre thereof through which a drive shaft 16 is located and to which the bush 15 is secured by grub screws 17 so as to be rotatable therewith.

The periphery of each plate 11, 12 is cut out at intervals to form onion carrying V-shaped notches 18. These notches 18 are shaped so that the apices of all the notches 18 fall on a common circle (pitch circle). The notches 18 are spaced evenly around the pitch circle e.g. twenty notches on a plate or disc of 24 to 30 inches diameter. Each notch 18 presents a V-shaped viewed axially of the disc and the tangent to the pitch circle at the apex of the notch bisects the notch so that the edges or sides of the notch lie on opposite sides of the line of travel represented by the pitch circle. The result of this is that the onions irrespective of size always have their axes on but transversely across this pitch circle. The angle of the V-notches 18 may be between 30° and 90° for example 45°. The direction of rotation is such that the wide open end precedes the apex.

Referring more particularly to FIGURES 1 and 2 the onion carrier 10 is mounted in bearings 21, 22 carried on the upright frame members of the onion treating machine 20, so that the shaft 16 is horizontal. The onion carrier 10 is rotated in a clockwise direction, as viewed in FIGURE 1, by an electric motor 23 and variable speed gearing.

In the example illustrated the drive from the electric motor 23 to the shaft 16 of the onion carrier 10 is carried out in two stages. The first stage comprises a V-belt drive from the electric motor 23 to a gearbox 24 and the second stage a chain and sprocket drive from the gearbox 24 to the shaft 16.

In order to carry out the first stage, a pulley wheel 27 having a V-shaped groove arranged around the periphery thereof, is provided on the shaft of the electric motor 23. Another pulley wheel 28 is provided on a shaft 29 extending from the gearbox 24 parallel to the shaft of the electric motor 23. The two pulley wheels 27, 28 are connected by a V-belt 30. In order to obtain a variable gearing between the electric motor 23 and the gearbox 24, the pulley wheel 27 is of a split V-type and the electric motor 23 is mounted on a base member 25, which is secured to the frame of the machine 20, so as to be movable towards and away from the gearbox 24. The movement of the motor 23 is effected by a screw 26 which engages in a thread provided in the base of the electric motor 23. By rotating the screw 26, for example, in a clockwise direction, the motor is moved away from the gearbox (i.e. to the left in FIGURE 2) and in so doing the V-belt 30 forces the sides of the split V-pulley wheel 27 apart so that its effective diameter is smaller thereby reducing the gearing ratio. Alternatively if the electric motor 23 is moved closer to the gearbox 24, for example, by turning screw 26 anticlockwise, the effective diameter of pulley wheel 27 is increased thereby increasing the gearing ratio.

In order to carry out the second stage the gearbox has a second shaft 31 parallel to the shaft 16 and extending at right angles to the shaft 29. A sprocket 32 is provided on the shaft 16 of the onion carrier 10 and is positioned on the shaft 16 in such a manner that it is in line with a sprocket 33. The two sprockets 32, 33 are interconnected by a chain 34.

The onions are fed singly by hand or machine on to successive notches 18, as the onion carrier 10 rotates, at the side where the open end of the notch is vertically above the apex (e.g. from a tray 45); the onion being arranged by an operator to have its top and tail transversely across the pitch circle. The onion is carried through about 60° of rotation of the discs to a treating position where there is provided a pair of knives 35 located on opposite sides of the pair of discs 11, 12 at the pitch circle. The knives 35 top and tail each onion (i.e. cut off the ends of the onion) whilst the onion carrier 10 is rotating after which the skin of each onion is split from top to tail by knives 36. Thereafter each onion is ejected from its notch 18 by the arms of a star wheel 37 which is driven, e.g. by chain and sprocket drive means operatively coupled to the chain 34, in synchronism with the rotation of the onion carrier 10.

Referring to FIGURE 4, the inner corner edges 40, 41 of V-shaped notches may be chamfered in order to provide V-seatings for the onions.

For large onions, the circular plates 11, 12 may be set further apart, e.g. to between 1.5 and 2 inches by having a spacer member (or members) 14 of the required thickness; and may have a less number of notches 18 on the carrier 10.

The advantage of the present onion carrier over known types of carriers is that the onions, irrespective of their size always have their axes on but transversely across the pitch circle.

Other details of the machine are more fully described in U.S. application Ser. No. 592,435, filed Nov. 7, 1966, and in the specifications of British applications Nos. 50,-303 of 1965; 50,304 of 1965 and 29,916 of 1966. Specifically, as set forth in the above-identified U.S. application, for holding the onions firmly in the notches 18 as they are presented to the knives 35, there is provided a star wheel 38 on a horizontal axis adjacent the knives on a radius greater than the pitch circle. The arms (e.g. five arms) of the star wheel successively enter between the discs 11, 12. The notches 18 push the onion against an arm and rotate the star wheel 38 which is restrained frictionally against free rotation so that the onion is pressed firmly into the notch.

I claim:

1. In an onion topping and tailing machine comprising a pair of knives, a pair of circular plates spaced apart from each other by a predetermined distance and having a succession of pairs of approximately V-shaped notches formed in said plates close to the peripheries thereof and means for rotating said plates about their common axis to carry the onions past the knives to cut off the tops and tails, the apices of the notches being located on a circle which is concentric with the carrier and which passes through an onion topping and tailing cutting position passing with the inside surfaces of each notch arranged symmetrically on opposite sides of a tangent to the circle at the apex of the notch, the notches being so shaped that the onions of any size contact the two inside surfaces of each notch, the direction of movement being such that the open ends of the notches precede the apices thereof, the space in between each pair of notches being free of obstruction; the improvement comprising a star wheel having arms which enter between the plates to hold the onions in their respective pair of notches while the onion is cut by the topping and tailing knives.

2. A machine as claimed in claim 1, and a second star wheel spaced from the first-named star wheel on the output side of the knives for ejecting the onions from the notches.

3. A machine as claimed in claim 1, and means mounting said star wheel for rotation about a horizontal axis spaced outside said circle.

4. A machine as claimed in claim 1, said star wheel being restrained frictionally against free rotation so that the onion is pressed firmly into the notch.

References Cited

UNITED STATES PATENTS 2,494,914   1/1950   Urschel et al. _____ 146—83

W. GRAYDON ABERCROMBIE, *Primary Examiner.*